TRANSISTOR DEFLECTION CIRCUIT WITH TEMPERATURE STABILIZED BLOCKING OSCILLATOR
Filed May 8, 1961
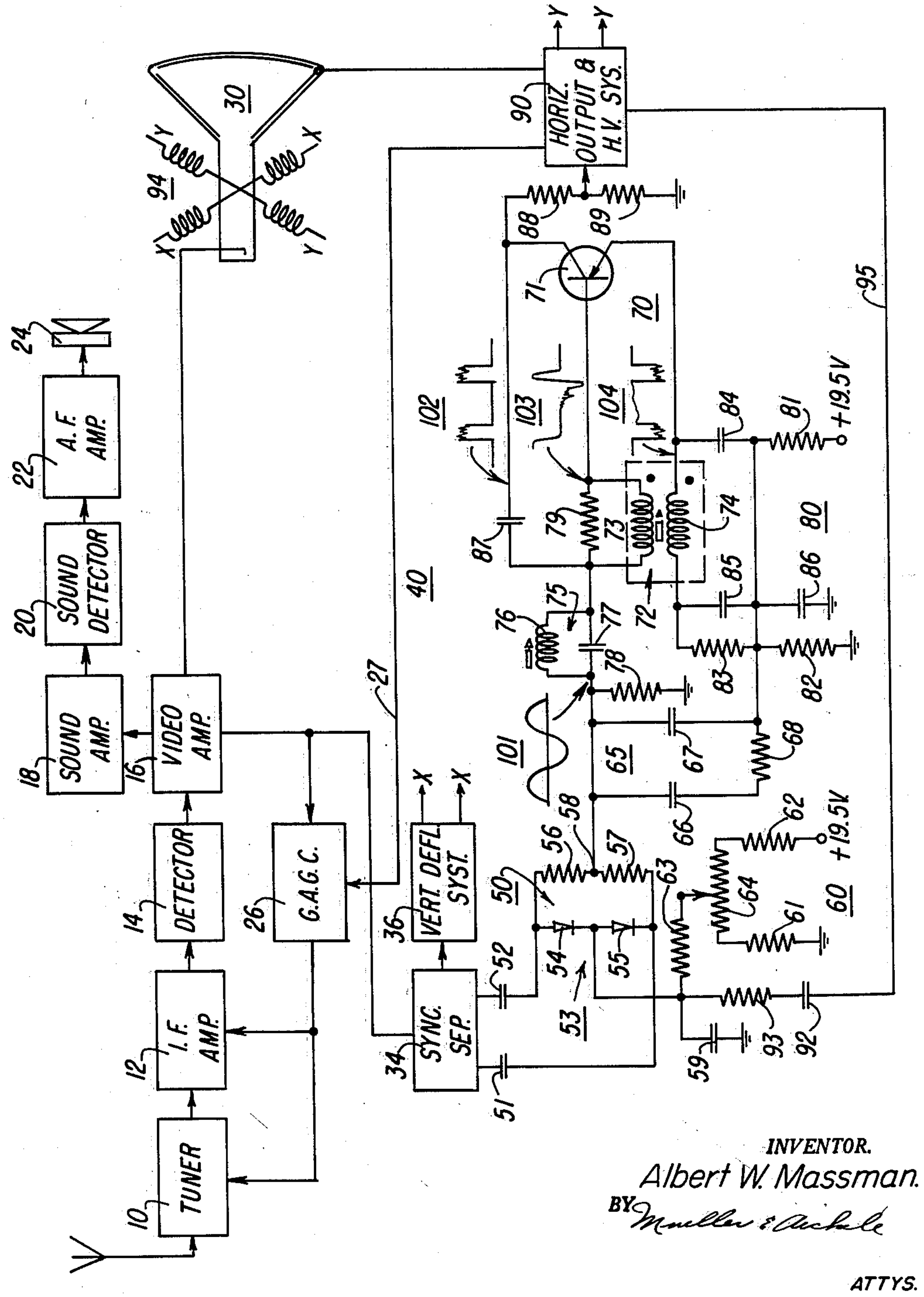
INVENTOR.
Albert W. Massman
BY Mueller & Aichele
ATTYS.

3,168,678
Patented Feb. 2, 1965

3,168,678

TRANSISTOR DEFLECTION CIRCUIT WITH TEMPERATURE STABILIZED BLOCKING OSCILLATOR

Albert W. Massman, Wheaton, Ill., assignor to Motorola, Inc., Chicago, Ill., a corporation of Illinois Filed May 8, 1961, Ser. No. 108,379
5 Claims. (Cl. 315—27)

This invention relates in general to transistorized television receivers and more particularly to a transistorized horizontal deflection system having a blocking oscillator with improved voltage and temperature stability characteristics.

Small size, high reliability, and low power requirements render transistors especially desirable for use in television receivers of the portable type operating from a self-contained power source such as a battery. Various portions of the circuitry customarily used for vacuum tubes may readily accept the substitution of transistors with only minor modifications. Other portions, however, may reqire substantially more in the way of modifications to insure optimum performance.

Particularly, a problem is presented in the line and field deflection circuits with regard to obtaining the desired stability characteristics. It is known that the gain characteristics of transistors change with variations in temperature and operating voltage. In a transistorized line deflection system, the blocking oscillator is therefore directly affected with respect to operating frequency according to these variations. A previous solution has been the addition of a parallel-resonant ringing circuit in the input circuitry of such an oscillator to provide stabilization at the desired frequency of operation. This solution has not been entirely satisfactory however, particularly in transistorized circuits where such stabilization depends upon the base current of the transistor and upon the resultant quality factor, or Q, of the inductive coil incorporated in the parallel-resonant ringing network.

It is therefore an object of the present invention to provide a transistorized horizontal deflection system having a blocking oscillator with improved voltage and temperature stability characteristics.

Another object is to provide a transistorized horizontal deflection system having a transistorized blocking oscillator with stability characteristics rendered substantially independent of operating current.

A feature of the invention is the provision of a transistorized horizontal blocking oscillator having a stabilizing parallel-resonant ringing network in its input circuitry with a regenerative feedback network coupling an output signal component to the ringing circuit thereby providing further stabilization at the controlled frequency of the oscillator with respect to the effects of variations in operating temperature and voltage.

The drawing shows a partial block and schematic diagram of a television receiver illustrating the present invention.

In practicing the invention, a transistorized horizontal deflection system is provided for a television receiver having a blocking oscillator essentially controlled by a source of unidirectional automatic frequency control voltage and including a resonant ringing circuit in the input circuitry to provide stabilization at the desired frequency. A regenerative feedback network is coupled between the output and input circuitry of the oscillator to feedback a signal component which is in phase with the current in the resonant ringing circuit to reenforce such current and provide further stabilization with respect to the effects of variations in temperature and operating voltage.

Referring now to the drawing, the illustrated television receiver, which may be battery operated and all-transistorized except for the picture tube and the high voltage rectifier, includes a tuner 10 which selects signals from an associated antenna to convert a received signal to a fixed frequency for further selection and amplification in the IF amplifier 12. Amplifier 12 is coupled to detector 14 which demodulates a received compromise video signal having line and frame synchronizing components, video frequency components, and a modulated sound carrier. The demodulated television signal is applied to the video amplifier 16 and this circuit provides the sound subcarrier which is coupled to the sound amplifier 18. The sound signal is then applied to a sound detector 20 and the demodulated sound signal is amplified in the audio amplifier 22 in order to drive the loudspeaker 24. The demodulated television signal is also applied to a direct current circuit from the detector 14 and through the video amplifier 16 to the gated automatic gain control circuit 26. Circuit 26 is gated by means of pulses occurring at the line or horizontal deflection frequency applied thereto over lead 27. A control potential developed by circuit 26 and having a value dependent upon the strength of the received signal is applied to the tuner 10 and the IF amplifier 12 for regulating the gain thereof. The detected and amplified video signal from the amplifier 16 is coupled to the cathode of the cathode ray picture tube 30. A video amplifier 16 is further coupled to the synchronizing signal separator circuit 34 which amplitude separates both the frame and line synchronizing signal components of the composite video signal. The frame or vertical synchronizing signal, standardized at 60 cycles, is then applied to the vertical deflection circuit 36 which develops a suitable sawtooth scanning current in the vertical deflection yoke winding 94 disposed upon the neck of the cathode ray tube 30.

Sync separator circuit 34 is further connected to the line or horizontal deflection system which develops and applies a 15.75 kc. scanning control signal to the horizontal winding of magnetic deflection yoke 94. This system includes automatic frequency control system 50, horizontal blocking oscillator 70 and the horizontal output and high voltage system represented in block form as numeral 90. The horizontal oscillator 70 generates positive output pulses, illustrated as waveform 102, in response to an applied direct current control voltage. Output circuit 90 is operative to provide a sawtooth current waveform in the horizontal winding of yoke 94 in response to such pulses for horizontal deflection of the beam in picture tube 30. Output circuit 90 further develops and applies the high voltage to the screen of picture tube 30. Automatic frequency control circuit (AFC) 50, maintains horizontal oscillator 70 in synchronization with the received line synchronization signals by comparing signals therewith which are fed back from the output stage 90 by lead 95.

Sync circuit 34 applies the line synchronization signal components of the composite video signal through coupling capacitors 51 and 52 to AFC circuit 50. The sync signals thus applied are 180° out of phase such that on being impressed across resistors 56 and 57, zero potential results at point 58. AFC circuit 50 includes a phase detector 53, consisting of diodes 54 and 55 in shunt with resistors 56 and 57. A voltage divider network 60 consisting of resistors 61, 62, 63 and potentiometer 64 applies a direct current potential to the junction of diodes 54 and 55. A forward bias is therefore applied to horizontal oscillator stage 70 through diode 55 according to the setting of potentiometer 64. Capacitor 59 is connected at the junction of diodes 54 and 55 to provide the necessary decoupling.

Horizonal oscillator stage 70 includes a transistor 71 having a base electrode connected to one side of secondary winding 73 of transformer 72. The other terminal of the secondary winding is connected to the parallel-resonant circuit 75, consisting of inductor 76 and capacitor 77. A resistor 79 is connected in shunt with secondary winding 73. The emitter electrode of transistor 71 is connected to one side of primary winding 74. The other terminal of primary winding 74 is coupled to voltage divider network 80, consisting of resistors 81, 82 and 83. Resistor 81 is connected between B+ and the junction of resistors 82 and 83; resistor 82 is returned to ground and resistor 83 provides the proper operating bias voltage for the emitter electrode of transistor 71 through secondary winding 74. The collector electrode of transistor 71 is returned to ground through load resistors 88 and 89 with their common junction forming the feed point for driving the horizontal output stage 90. Capacitor 84 is connected between the emitter electrode and the common junction of voltage divider network 80. Capacitor 85 is connected in shunt with resistor 83 with capacitor 86 being connected in shunt with resistor 82. Feedback capacitor 87 is connected between the collector electrode and the junction of secondary winding 73 and tuned circuit 75. A base bias resistor 78 is connected between junction 58 and ground.

In operation, a direct current forward bias from voltage divider network 60 is applied to the junction of diodes 54 and 55, and in turn to the base electrode of transistor 71 through resistor 57, coil 76 and resistor 79. As transistor 71 begins to conduct, current through primary, or second, winding 74 increases which results in a regenerative signal being fed back to the base electrode through secondary, or first winding 73, thereby driving transistor 71 into harder conduction. While transistor 71 is conducting, capacitors 84 and 85 are being charged. Upon transistor 71 reaching saturation, the current through primary winding 74 reaches a constant value which terminates the regenerative feedback through secondary winding 73 and causes transistor 71 to therefore decrease its level of conduction. Capacitor 85 discharges through resistor 83 to reverse the current flow in winding 74, thereby feeding back a degenerative signal to the base electrode of transistor 71 to quickly cut it off. The time constant of the network formed by resistor 83 and capacitor 85 effectively determines the time interval between output pulses from horizontal oscillator 70. Cacapictor 84 determines the pulse width. The output pulses from oscillator 70 are coupled to horizontal output stage 90 to provide the proper scanning control signal to yoke 94 on picture tube 30.

A portion of the output signal from output stage 90 is fed back by way of lead 95 through coupling capacitor 92 and resistor 93 to phase detector 53 to enable the proper synchronization of horizontal oscillator stage 70. If the output signals fed back to the junction of diodes 54 and 55 are in phase with the sync pulses from sync separator circuit 34, the resultant voltage developed across resistors 56 and 57 will balance out. If the feedback signals are out of phase with the sync pulses, an unbalance occurs resulting in a direct current voltage being developed at the junction 58 of resistors 56 and 57, the magnitude and polarity depending upon the type and amount of correction required. This correction voltage adds or subtracts from the forward bias voltage developed by voltage divider network 60 to maintain the blocking oscillator stage 70 in proper synchronization.

Filter network 65 consisting of capacitor 66 in shunt with capacitor 67 and resistor 68 in series at the output of the phase detector determines the pull in range and insures only the application of a D.C. potential to the base of transistor 71. By adjusting the forward bias applied to transistor 71, potentiometer 64 functions as a horizontal hold control.

As previously mentioned, changes in operating voltages and ambient temperature result in variations in the conduction characteristics of transistor 71, which in turn cause variations in its operating frequency. To provide a means of stabilization a parrallel resonant circuit 75 is provided in the base electrode circuit to "ring" at the horizontal line frequency of 15.75 kc. and thereby minimize the effects of such voltage and temperature variations. The degree of stabilization, however, has not been found sufficient over the range desired. This results from the ringing action of resonant circuit 75 being limited to the base electrode current of transistor 71 and to the quality factor, or Q, of coil 76. To increase the stability, an additional feedback circuit is provided by capacitor 87 to feed back a signal from the collector electrode circuit which is in phase with the ringing current in parallel-resonant circuit 75 to aid and strengthen the ringing action therein.

It is to be emphasized that the feedback from capacitor 87 is not in itself sufficient to provide the desired stabilization for horizontal oscillator 70 since this would require an excessive direct current voltage swing from phase detector 53 to maintain proper synchronization. By combining the feedback provided by capacitor 87 with the ringing action of parallel-resonant circuit 75, a sufficiently stable horizontal oscillator is thereby attained which can be controlled by only a moderate direct current control voltage provided by the phase detector.

In a specific embodiment of the invention it has been found that components of the following types and values provide satisfactory results:

| | |
|---|---|
| Transistor 71 | Type 4462 (Motorola). |
| Transformer 72 | 3.5 to 1 wound on ferrite slug. |
| Inductor 76 | 5 millihenries. |
| Capacitor 77 | 0.2 microfarad. |
| Resistor 78 | 68,000 ohms. |
| Resistor 79 | 8,200 ohms. |
| Resistor 81 | 330 ohms. |
| Resistor 82 | 470 ohms. |
| Resistor 83 | 1,000 ohms. |
| Capacitor 84 | .001 microfarad. |
| Capacitor 85 | .02 microfarad. |
| Capacitor 86 | 1 microfarad. |
| Capacitor 87 | .001 microfarad. |
| Resistor 88 | 1,000 ohms. |
| Resistor 89 | 100 ohms. |

This invention therefore provides a horizontal deflection system having a horizontal blocking oscillator with improved stability characteristics over a wide range of ambient temperature and operating voltages and yet is readily controlled by a moderate control voltage for effective synchronization.

I claim:

1. In a deflection system for a cathode ray tube; a blocking oscillator for producing output pulses at a predetermined frequency and including a transistor having input, output and common electrodes, a direct current bias network connected to said common electrode of said transistor for energizing the same and including means for determining the frequency of said output pulses, input circuit means for applying a direct current bias voltage to said input electrode to control the frequency of said oscillator, transformer means regeneratively coupling said input and said common electrodes to sustain oscillations, an output load circuit connected to said output electrode for utilizing the output signals therefrom, said input circuit means including a resonant ringing circuit for developing a signal at the predetermined frequency and stabilizing the control frequency of said oscillator, and feedback means including a capacitor coupled to said output electrode and said ringing circuit for feeding back energy to said ringing circuit in regenerative phase to stabilize said oscillator with respect to variations in operating voltage and ambient temperature.

2. In a line deflection system for developing a deflection signal for a magnetic deflection yoke disposed upon a cathode ray tube, a blocking oscillator for producing output pulses of predetermined width, including in combination; a transistor having input, output and common electrodes, transformer means regeneratively coupling said input and common electrodes, a voltage-divider time-constant network coupled to said common electrode for energizing said transistor and including means for determining the rate and duration of said output pulses, means for applying a direct current automatic frequency control voltage to said input electrode for controlling the frequency of said oscillator, output circuit means coupled to said output electrode for utilizing said pulses and including a deflection winding on the cathode ray tube, a parallel resonant ringing network included in said input electrode circuit and operative at the line deflection frequency for stabilizing the frequency of said oscillator, and regenerative feedback means including a capacitor coupled between said output and said input electrodes for feeding back a signal in phase with the current in said resonant circuit for providing further stabilization with respect to operating voltages and variations in temperature.

3. In a deflection system for a cathode ray tube; a blocking oscillator including a transistor having base, emitter and collector electrodes, transformer means having first and second windings, input circuit means coupled to said base electrode and including a parallel-resonant circuit connected in series with said base electrode through said first winding and a resistor connected between said parallel-resonant circuit and a reference potential, said parallel-resonant circuit providing a ringing signal at the deflection frequency to stabilize the frequency of said oscillator, a direct current bias network connected to said emitter electrode through said second winding for energizing said transistor, output circuit means connected to said collector electrode for utilizing output signals therefrom, and a capacitor connected between said collector electrode and the junction of said first winding and said parallel-resonant ringing circuit for feeding back signal energy in regenerative phase with the signal in said parallel-resonant ringing circuit to further stabilize said oscillator.

4. A blocking oscillator for producing output pulses at a predetermined frequency including in combination; a transistor having base, emitter and collector electrodes, transformer means having first and second windings for coupling regenerative signals therebetween, a source of direct current bias voltage, a parallel resistance-capacitance network for determining the rate of said output pulses, said resistance-capacitance network and said second winding being connected in series between said bias voltage source and said emitter electrode, a first capacitor connected between said emitter electrode and said bias voltage source for determining the duration of said output pulses, input circuit means including a parallel-resonant circuit connected in series with said base electrode through said first winding, means for supplying a direct current control voltage to said input circuit means for controlling the frequency of said oscillator, said parallel-resonant circuit providing a ringing action at the predetermined frequency to stabilize the controlled frequency of said oscillator, an output load circuit connected to said collector electrode for developing said output pulses thereacross, and a second capacitor connected between said collector electrode and the junction of said first winding and said parallel-resonant ringing circuit for feeding back a signal in regenerative phase to further stabilize said oscillator with respect to variations in operating voltage and ambient temperature.

5. A blocking oscillator for producing output pulses at a predetermined frequency including in combination; a transistor having base, emitter and common electrodes, transformer means having first and second windings for coupling a regenerative signal therebetween, input circuit means including inductance and capacitance means connected as a parallel-resonant circuit, said parallel-resonant circuit being connected in series with said base electrode through said first winding, means for applying a direct current control voltage to said input circuit means for controlling the frequency of operation of said oscillator, said parallel resonant circuit producing a ringing current at the predetermined frequency in response to current in said base electrode to stabilize the controlled frequency of said oscillator, direct current bias supply means including a resistive voltage divider connected to said emitter electrode through said second winding for energizing said transistor, output circuit means connected to said collector electrode for utilizing the output pulses therefrom, and a shunt capacitor connected between said collector electrode and the junction of said first winding and said parallel-resonant ringing circuit for feeding back energy in regenerative phase with the ringing current in said inductance means to further strengthen the stabilizing action provided by said parallel-resonant ringing circuit.

References Cited in the file of this patent

UNITED STATES PATENTS 2,939,040 Isabeau ---------------- May 31, 1960